Feb. 22, 1966 F. W. CROTTY 3,236,950

RADIO RECEIVERS

Filed July 18, 1961 2 Sheets-Sheet 1

INVENTOR.
Francis W. Crotty
BY John J. Pederson
Atty.

INVENTOR.
Francis W. Crotty
BY John J. Pederson
Atty.

3,236,950
RADIO RECEIVERS
Francis W. Crotty, Park Ridge, Ill., assignor to Zenith Radio Corporation, a corporation of Delaware
Filed July 18, 1961, Ser. No. 124,981
9 Claims. (Cl. 179—15)

Figures 1, 2:
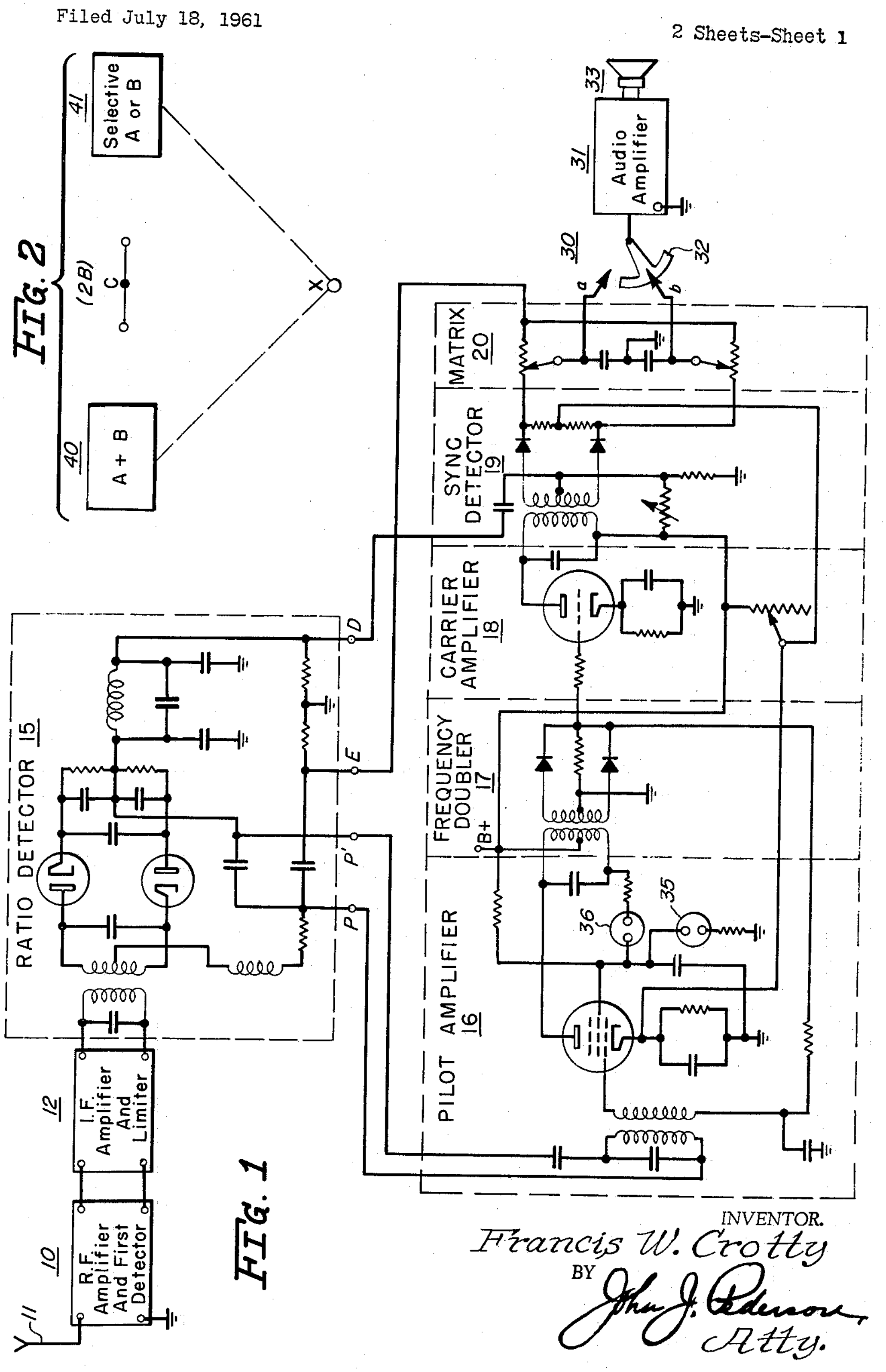

The present invention relates to radio receivers which may be employed in the reception of broadcast stereophonic programs.

With the recently announced Federal Communications Commission regulations authorizing the transmission of stereophonic programs, an increasing trend to radio broadcasting utilizing a transmitted single main carrier stereophonic signal may be anticipated. To achieve true stereophonic reproduction, it is essential that the reproducing system comprise two separate audio channels driving appropriately spaced loudspeaker systems. In the usual case, the receiver for the reproduction of stereo programs is constructed with a single chassis containing one of the speakers and all of the receiving and amplification circuitry necessary to produce the stereophonic programs signals, while an associated remote speaker system may be positioned for optimum stereo effect. Another conventional arrangement is one in which the receiving and amplifying circuitry are included in one master unit and two sound reproducers are spaced apart from each other and from the master unit. In either of these arrangements, interconnecting cables or cords which are both unsightly and inconvenient are required to couple one or more remote loudspeakers to the amplification circuitry.

It is a primary object of this invention to provide a novel radio receiver for use in stereo reception of broadcast stereophonic programs.

It is another object of this invention to provide a radio receiver for use in faithfully reproducing broadcast stereo information without the need of interconnecting cords between spaced sound reproducers.

Under the previously mentioned Federal Communications Commission regulations, the transmitted stereophonic program signals are reproducible by existing monaural receivers, but without the benefit of any stereo effect. It is of course technologically possible to revise existing monaural receivers for true stereo reception, but this requires extensive reworking of the received circuitry and is not commercially or economically feasible. Alternatively, it is possible to produce separate adapter units for connection to conventional monaural receivers to effect true stereo reproduction, but such adapters must be matched to the monaural receivers with which they are to be used, and because of the large number of different monaural receiver constructions in the hands of the public it is not feasible to construct such adapters with universal applicability. Moreover, adapters of this sort are of no independent utility and are therefore inherently of temporary and restricted commercial interest.

It is therefore another object of this invention to provide a new and improved radio receiver which can be used with existing monophonic receivers to provide stereo reception.

It is a further object of this invention to provide a novel radio receiver which can be paired either with a similar unit or with a monophonic receiver to provide stereo reception of broadcast stereophonic programs.

Still another object of the invention is to provide a new and improved radio receiver which may be employed in conjunction with existing monaural receivers to effect stereo reproduction of broadcast stereophonic programs, or alternatively may be employed separately to effect monophonic reception of either monaural or stereophonic broadcasts.

In accordance with the invention, a receiver for use in a stereophonic broadcast system in which a carrier is modulated in accordance with the sum of the left and right program signals and is separately modulated in accordance with their difference comprises circuit means, including a tunable radio-frequency amplifier, for selecting the carrier signal. A detector is coupled to the circuit means for demodulating the carrier signal to derive therefrom a composite signal having components representing the sum and the difference of the program signals. The receiver further comprises program-signal-developing means, coupled to the detector, for utilizing the composite signal to develop at least one of the program signals, and an audio system constituting the sole audio utilizing arrangement of the receiver and consisting of a single signal-translating channel terminating at one end in an audio-signal transducer and coupled at its opposite end to the program-signal-developing means to derive therefrom and reproduce only one of the program signals.

Figure 3:
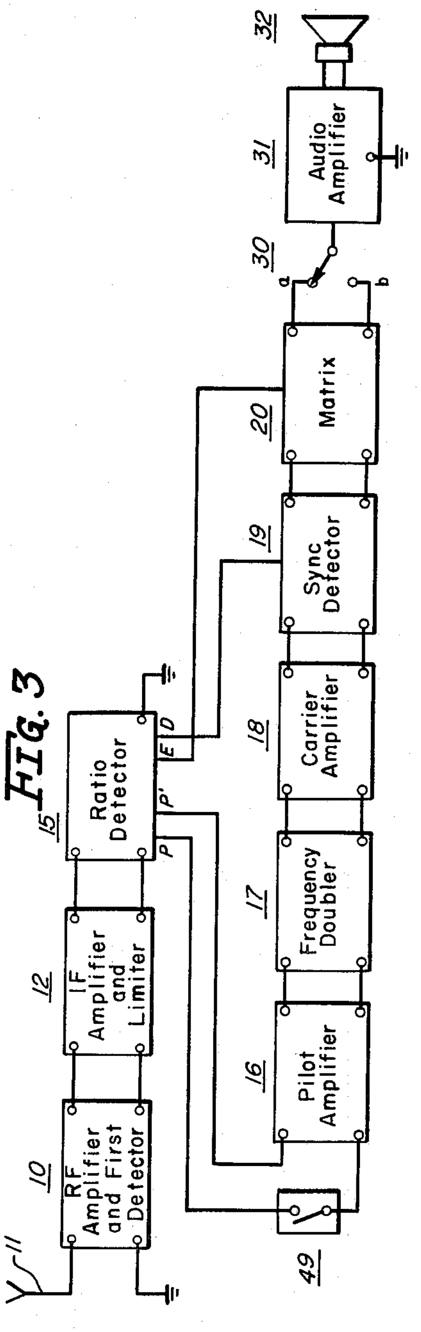
Figure 4:
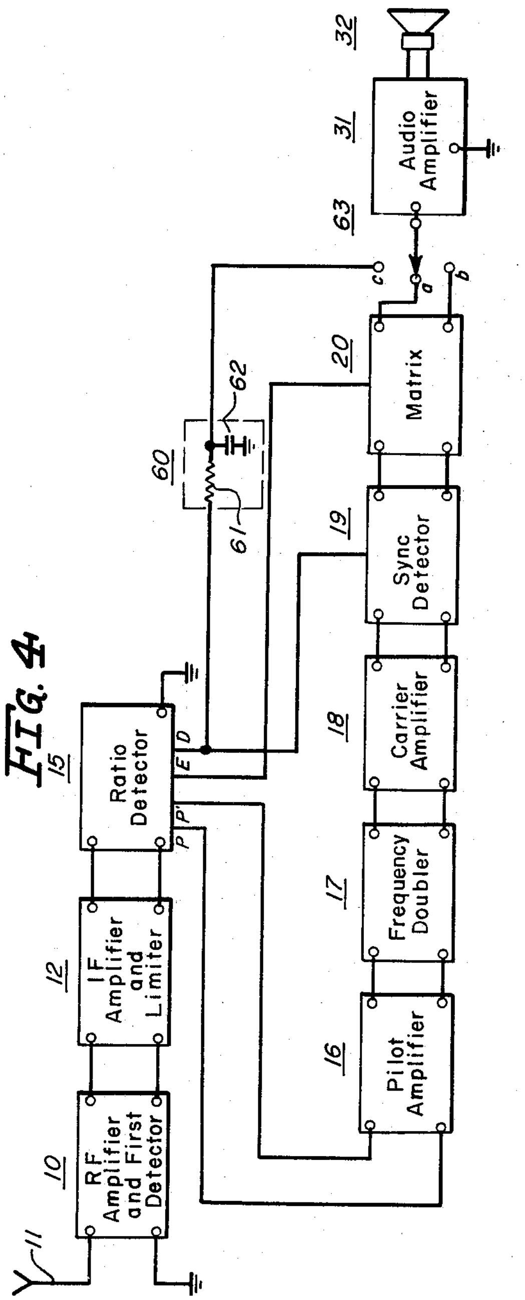

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 1 is a schematic representation of a preferred embodiment of the receiver of the invention;

FIGURE 2 is a diagram depicting the stereophonic sound pattern produced by a receiver of the present invention when used in conjunction with a conventional monaural broadcast receiver; and FIGURES 3 and 4 are simplified schematic representations of alternative embodiments of the invention The embodiments of the receiver of the present invention which will be subsequently described are discussed as utilizing the previously mentioned Federal Communications Commission standard signal. The approved standard signal is in the form of a single carrier frequency-modulated with the sum of the left and right program signals hereinafter designated as A and B, the fundamental components of a suppressed-carrier amplitude-modulated sub-carrier signal carrying the difference of the A and B signals, where the expression "fundamental components" means the first order modulation sidebands which attend the fundamental of the sub-carrier and excludes higher order sidebands attendant the harmonics of the sub-carrier signal, and a pilot signal of a frequency corresponding to one-half the frequency of the sub-carrier. Since the subject invention concerns itself more particularly with the receiver, the preferred forms of transmitter for developing the aforementioned standardized signal need not be illustrated or described herein; however, illustrative transmitters are disclosed in detail in the copending application of Robert Adler et al., Serial No. 22,926 filed April 18, 1960, and also in the copending application of Carl G. Eilers, Serial No. 23,030, filed April 18, 1960, both assigned to the same assignee as the present application. Although the receivers herein disclosed are described in conjunction with the aforementioned standardized FM stereophonic transmission signal, the invention is broadly applicable to any single carrier stereophonic transmisison system irrespective of the type of modulation. For example, the stereophonic transmission may employ amplitude-modulated sub-carriers, phase-modulated sub-carriers, an amplitude and phase modulated main carrier, or any well known multiplex technique compatible with a single main carrier transmission system.

Referring now more particularly to FIGURE 1, the receiver thereshown may be employed for monophonic reception of either a monaural or stereophonic broadcast or may be employed to reproduce either one of the two channels or program signals of a frequency-modulated broadcast stereo signal. The receiver adjusts itself between monophonic and single-channel stereophonic FM reproduction automatically in accordance with the type of broadcast signal that is received. In presenting the structure and operation of this receiver, it is convenient to first consider its use in the reproduction of one of the two program signals of a stereophonic frequency-modulated broadcast of the type transmitted by apparatus described in the above-identified Adler et al. application.

The arrangement of FIGURE 1 comprises receiver circuits which up to the second signal detector, are conventional. They include a tunable radio-frequency amplifier of any desired number of stages and a heterodyning stage or first detector, these being collectively represented by block 10. The input of the amplifying portion connects with a wave-signal antenna 11. The output of block 10 connects with a unit 12 which will be understood to include any desired number of stages of intermediate-frequency amplification and one or more amplitude limiters.

As explained in the Adler et al. application, the receiver is to have certain characteristics which are superior to those found in conventional monophonic FM receivers. More specifically, it is preferred that the receiver have a high sensitivity so that the signal-to-noise ratio, particularly on stereo operation, will be acceptable in fringe areas. Both automatic gain control for the RF and IF stages and automatic frequency control for the heterodyne oscillator of unit 10 are desirable and may be considered to have been included in the block showing. The intermediate-frequency bandwidth of the usual monaural FM receiver is 150 to 180 kilocycles (kc.) wide at the minus 6 decibel point but the bandwith for the receiver under consideration should be wider to prevent intermodulation or cross-talk between the several services that may be simultaneously accommodated in any single radiation. A bandwidth of 230 kc. is adequate if automatic gain control retains the level of signal through the RF and IF amplifiers at a substantially constant value in spite of variations in intensity of the received signal.

Following the IF amplifier and limiter 12 is a frequency-modulation detector 15 responsive to the amplitude limited intermediate-frequency signal for developing a composite signal corresponding to the modulation function of the received carrier. Since effective amplitude limiting is highly desirable in this receiver, it is convenient to follow the limiter of unit 12 with a ratio detector 15 which also performs an amplitude limiting function. The composite signal which is detected in frequency-modulation detector 15 is supplied to three output circuits which supply the composite signal to various portions of the receiver. A set of terminals P and P′ which are coupled to the output of detector 15 supply the composite signal to a pilot amplifier network 16.

While the ratio detector may derive a composite signal representing the modulation function in accordance with which the received carrier has been frequency modulated, it is necessary for stereo reproduction to have a further demodulation of the sub-carrier which conveys the difference information. Since the sub-carrier is transmitted with no carrier component, the receiver has means responsive to the pilot signal of the received transmission for deriving a demodulation signal having a fixed frequency and phase relation to the carrier component of the suppressed-carrier amplitude-modulated sub-carrier. This means includes a frequency-selective amplifier 16 of the pentode type which is transformer-coupled to the ratio detector at terminals P, P′ and which is tuned to the pilot frequency.

Pilot amplifier 16 in turn is coupled to a frequency doubler 17. The frequency doubler, when excited by the pilot signal, produces a signal of the same frequency as, and with a fixed phase relation to, the fundamental component of the carrier conveying the difference information. Sufficient control of this phase may be provided by variable tuning of one or more of the tuned circuits included in the pilot amplifier and frequency doubler chain.

A carrier amplifier 18 receives the signal from doubler stage 17 and amplifies it to a magnitude sufficient to energize a synchronous detector stage 19 which is coupled to the output of amplifier 18. The composite signal of the ratio detector is fed from a terminal D of the detector to the synchronous detector 19 for demodulation. The demodulation signal obtained from amplifier 18 and the composite signal obtained from detector 15 cause synchronous demodulation in detector 19 to the end that one diode of the detector develops predominantly the A audio signal with a slight contribution of the B audio signal while the remaining diode of the detector develops principally the B audio signal with a slight contribution of the A audio signal. The desired result of clean separation of the A and B audio signals is obtained by matrixing in network 20 due to the presence of a composite signal obtained from terminal E of detector 15 which is opposite in phase to that obtained from terminal D. By the addition of this opposed phase signal and proper adjustment of the matrixing network a substantially pure A signal appears at terminal *a* of switch 30 and a substantially pure B signal is obtained at terminal *b* of switch 30. The matrixing network 20, in addition to providing the function of a low-pass filter for removing superaudible components from the detector output, may simultaneously perform the desired function of de-emphasis. This matrixing operation is explained more fully in the copending application of Adrian De Vries, Serial No. 118,009, filed June 19, 1961, and assigned to the same assignee as the present application.

It is noted that the matrixing operation need not be performed by a passive matrix network, but may be accomplished electronically by the use of an active stage such as a beam deflection tube serving as the synchronous detector, as shown and described in the copending application of Adrian De Vries, Serial No. 22,830 filed April 18, 1960, and assigned to the same assignee as the present application. A detector may also be employed in combination with a separate active matrix stage if desired and their combination may be used to derive a composite signal having components corresponding to and representing the sum and difference signals respectively and for developing from the composite signal either the A or B program signals, or both.

Matrix 20 thus supplies two output signals A and B, one of which is presented to a contact *a* of a switch 30. In like fashion the other output signal is delivered to a contact *b* of switch 30. These terminals are selectively coupled to an audio amplifier 31 by a movable blade 32 of switch 30. A loudspeaker system 33 is coupled to amplifier 31. Depending on the setting of the switch 30, audio amplifier 31, which consists of a single audio translating channel and, together with speaker system 33, constitutes the sole audio utilizing arrangement of the receiver, provides an amplified A signal or an amplified B signal to the speaker for reproduction. If the switch is set to span both contacts *a* and *b*, the audio amplifier amplifies the $A+B$ or sum signal and translates it to the loudspeaker thereby producting the two stereo program signals monophonically.

It is desirable to know whether a particular program is being broadcast monaurally or stereophonically. A set of indicator lamps 35 an 36 of FIGURE 1 are used this purpose, as described and claimed in the above-identified De Vries application. Lamp 35 is illuminated during non-stereophonic transmission and is extinguished during intervals of stereophonic transmission. Lamp 36 on the other hand is excited during intervals of stereophonic transmission and it is extinguished during intervals of non-stereophonic transmission.

As previously mentioned, with the proper setting of the blade of switch 30 it is possible to reproduce the A signal, the B signal, or the sum of the A and B signals. The receiver is also capable of automatically reproducing a monophonic signal, and it does so irrespective of the position of switch 30, automatically adopting either the stereophonic operating mode or the monophonic operating mode in accordance with the characteristic of the received transmission, as explained in the above-identified De Vries application Serial Number 118,009.

In accordance with one aspect of the invention, two receivers of the type shown in FIGURE 1 may be employed to reproduce the A and B program signals respectively, and by appropriately spacing the two receivers true stereophonic reproduction is obtained without the need of interconnecting wires or cables between the two units. By constructing the receivers with transistors in lieu of vacuum tubes and providing self-contained battery compartments, even the power cords can be eliminated.

In accordance with another aspect of the invention it has been found that the receiver of FIGURE 1 may be employed in conjunction with a conventional monaural or monophonic FM receiver, whatever its specific construction or circuitry, to provide a program rendition utilizing all modulation components of a broadcast stereophonic program signal, and thus to achieve true stereophonic program reception. With reference to FIGURE 2, a conventional monaural receiver 40 reproduces the $A+B$ channel irrespective of whether the signal transmitted is stereophonic or monophonic and is spaced from a receiver 41 which embodies the invention. Receiver 41 may be of the type shown in FIGURE 1 and is capable of selectively reproducing the A or B signals of a stereophonic broadcast. To receive a stereophonic broadcast, both receivers are tuned to the frequency of the same main carrier, their respective volume controls are placed at effectively the same level, and receiver 41 is set to reproduce the right program signal B. In such operation, it has been found that the B signal appears to a listener equidistant from the receivers at a point X, to originate from a point C midway between the two receivers. The intensity of the sound at point C appears to have a magnitude 2B corresponding to the algebraic sum of the B signal from receiver 41 and the A component of the $A+B$ signal from receiver 40. If the volume control setting of receiver 41 is increased, the sound center C is effectively shifted toward receiver 41. Alternatively, if the volume control is moved in a direction to decrease the amplitude of the signal from receiver 41, the sound center moves toward receiver 40. The A signal is always reproduced by receiver 40 and only receiver 40. Thus irrespective of where the listener is positioned in the room, the A signal always comes from receiver 40 while the B signal appears to come from some point other than receiver 40 depending on the setting of the volume control of receiver 41 and the position of the listener. Thus a true stereophonic rendition is obtained. A desirable balance setting between A and B signals may be obtained, for any given listening point, by varying the volume control of the receiver 41.

Similarly, a stereophonic rendition may be obtained by spacing receiver 41 to the left of monaural receiver 40 and setting it to reproduce the left program signal A. By providing a receiver which selectively reproduces either the A or B channel of a stereophonic broadcast, the receiver may be spaced either to the left or right of a conventional monaural receiver, and it is possible to achieve a stereo rendition irrespective of the position of the monaural receiver in the room.

It is of particular significance to note that the invention thus provides for true stereophonic rendition of broadcast stereo programs despite the fact that actual separation of only one program signal is effected. The rendition thus obtained is surprisingly similar to that obtained in orthodox fashion by isolating both left and right program signals, and the somewhat smaller sound separation achieved for a given physical spacing is readily compensated by increasing the latter, especially as there are no interconnecting wires or cables. Moreover, and also of great significance and advantage, it is not necessary to match any of the characteristics of the monaural receiver; the special receiver of the present invention may be employed universally, in conjunction with monaural receivers of all varieties and without modification or alteration of either unit, to achieve stereo reproduction.

Still another important advantage of the inventive receiver is that it may readily be constructed as a portable or table model unit, which constructions render it independently useful as a monaural receiver during intervals of non-use in stereo service. The limitation thus imposed on the number and size of loudspeakers in the speaker system of the satellite unit has been found to have a negligible effect on the quality and depth of stereophonic reproduction achieved.

It is well understood that some small increment of extraneous noise is inherent in stereo broadcasting, due to the greater bandwidth of the broadcast signal, and this is tolerated for the sake of achieving the stereo effect. Additional noise components are also generated by the pilot amplifier 16, frequency doubler 17, and carrier amplifier 18 networks which amplify and produce a demodulation signal to produce the A and B signals. In the receiver of FIGURE 1, these stages are active in developing the $A+B$ signal obtained by directly adding the two outputs of the matrix signal, with the result that a small but undesirable amount of extraneous noise may be introduced in monophonic reproduction of stereo signals. This result is avoided by modifying the receiver as shown in FIGURE 3.

In the embodiment of FIGURE 3, the sum of the A and B signals is obtained by selectively opening the circuit conveying the received pilot signal to pilot amplifier 16 thereby preventing demodulation of the composite signal at detector 19. This is accomplished by a switch contact pair 49 inserted in one of the conductors between the output terminals P, P′ of detector 15 and amplifier 16.

When switch pair 49 is closed and a stereo signal is being transmitted, the receiver of FIGURE 3 operates in the same manner as previously described to produce the A program signal at contact *a* of switch 30 and the B program signal at contact *b* of switch 30. The switch is positioned to selectively choose the A or B channel as desired by the listener and conveys the selected signal to the speaker system 32 for reproduction. With switch 49 open, the pilot signal is not presented to amplifier 16 and no demodulation signal is developed by frequency doubler 17. Thus synchronous detector 19 does not demodulate the composite signal; instead the detector and matrixing network act solely as passive networks and the $A+B$ term of the composite signal obtained from detector 15 appears at both contacts *a* and *b* of switch 30. Although the entire composite signal is present at contacts *a* and *b* of switch 30, the sub-carrier signal and the pilot signal are returned to ground by a high pass filter in the matrixing network. The two switches 49 and 30 are preferably ganged together so that one control will enable a listener to reproduce the A channel, the B channel, or the sum of the A and B channels. The receiver of FIGURE 3 produces the sum of the A and B program signals of a stereo broadcast with less noise but the monaural-stereo indicators, such as 35, 36 of FIGURE 1, which rely on the presence of the pilot signal in the demodulation-signal-developing stages, are inoperative.

The embodiment of FIGURE 4 provides for selectively reproducing the A or B program signals of a transmitted stereophonic signal and in addition provides the combination of a relatively noise-free $A+B$ signal as well as full utilization of such stereo indicators. However, the entire composite signal is extracted at output terminal D of the ratio detector 15 and is presented to a de-emphasis network 60 of conventional construction comprising a series resistor 61 and a shunt capacitor 62. A conductor couples the junction between resistor 61 and capacitor 62 to a third contact *c* of switch 63. If desired a resistor may be placed in parallel with capacitor 62 to reduce the level of the $A+B$ signal to that of the signals appearing at the output of matrix network 20. Matrixing network 20 again has two outputs leading to *a* and *b* contacts of the switch 63. A movable blade of switch 63 in turn is connected to audio amplifier 31 which is coupled to speaker 32.

During transmission of a stereo broadcast, the listener may selectively reproduce the A program signal, the B program signal, or he may directly reproduce a de-emphasized $A+B$ signal by way of network 60. Matrixing network 20 normally de-emphasizes the reproduced $A+B$ signal, but when obtaining the $A+B$ signal directly from detector 15, it is necessary to have the additional de-emphasis network 60.

With the arrangement of FIGURE 4 indicators 35, 36, which are responsive to the presence of a pilot signal in the demodulation-signal-generating channel, remain effective because the demodulation-signal-generating channel remains operative at all times irrespective of the setting of switch 63. In addition, the listener is provided with an $A+B$ signal which contains very little extra noise when compared to the original transmitted signal because the $A+B$ signal is taken directly from detector 15. The receiver of FIGURE 4 also automatically reproduces a monaurally transmitted signal irrespective of the setting of switch 63, as previously explained.

Thus the invention provides new and improved radio receivers for use, either in pairs or in conjunction with conventional monaural receivers, in achieveing stereophonic renditions of broadcast stereo programs. The receivers of the invention provide the ultimate in flexibility since no interconnecting wires or cables are required. Moreover, these objectives are achieved with a construction which needs not be matched to the characteristics of companion units, and which possesses independent utility as a monaural receiver of both monophonic and stereophonic broadcasts.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a stereophonic broadcast system in which a carrier signal is modulated in accordance with the sum of the correlated left and right program signals and is separately modulated in accordance with their difference, a receiver comprising: circuit means, including a tunable radio-frequency amplifier, for selecting said carrier signal; a detector, coupled to said circuit means, for demodulating said carrier signal to derive a composite signal having components representing said sum and said difference of said program signals; program-signal-developing means, coupled to said detector, for utilizing said composite signal to develop both of said program signals; switch means, coupled to said program-signal-developing means, for selecting one of said developed program signals; and an audio system constituting the sole audio utilizing arrangement of the receiver and consisting of a single signal-translating channel terminated at one end in an audio-signal transducer and coupled at its opposite end to said switch means to derive therefrom and reproduce only said selected one program signal.

2. In a stereophonic broadcast system in which a carrier signal is modulated in accordance with the sum of the correlated left and right program signals and is separately modulated in accordance with their difference, a receiver comprising: circuit means, including a tunable radio-frequency amplifier, for selecting said carrier signal; a detector, coupled to said circuit means, for demodulating said carrier signal to derive a composite signal having components representing said sum and said difference of said program signals; program-signal-developing means, coupled to said detector, for utilizing said composite signal to develop both of said program signals; switch means, coupled to said program-signal-developing means, having a first position for selecting one of said program signals and a second position for simultaneously selecting and combining both of said program signals; and an audio system constituting the sole audio utilizing arrangement of the receiver and consisting of a single signal-translating channel terminated at one end in an audio-signal-transducer and coupled at its opposite end to said switch means to derive therefrom and reproduce only said selected one program signal when said switch means is in said first position and said selected combined program signals when said switch is in said second position.

3. In a stereophonic broadcast system in which a carrier signal is modulated in accordance with the sum of the correlated left and right program signals and is separately modulated in accordance with their difference, a receiver comprising: circuit means, including a tunable radio-frequency amplifier, for selecting said carrier signal; a detector, coupled to said circuit means, for demodulating said carrier signal to derive a composite signal having components representing said sum and said difference of said program signals; program-signal-developing means, coupled to said detector, for utilizing said composite signal to develop both of said program signals; switch means coupled to said program-signal-developing means having a first position for selecting one of said program signals, a second position for selecting the remaining one program signal and a third position for simultaneously selecting and combining both of said program signals; and an audio system constituting the sole audio utilizing arrangement of the receiver and consisting of a single signal translating channel terminated at one end in an audio-signal transducer and coupled at its opposite end to said switch means to derive therefrom and reproduce only said one selected program signal when said switch means is in either said first or second positions and said selected combined program signals when said switch is in said third position.

4. In a stereophonic broadcast system in which a carrier signal is modulated in accordance with the sum of the correlated left and right program signals and is separately modulated in accordance with their difference, a receiver comprising: circuit means, including a tunable radio-frequency amplifier, for selecting said carrier signal; a detector, coupled to said circuit means, for demodulating said carrier signal to derive a composite signal having components representing said sum and said difference of said program signals; program-signal-developing means, coupled to said detector, for utilizing said composite signal to develop at least one of said program signals;

switch means coupled to said program-signal-developing means and said detector for selecting either said developed program signal or said components of said composite signal representing said sum of said program signals; and an audio system constituting the sole audio utilizing arrangement of the receiver and consisting of a single signal-translating channel terminated at one end in an audio signal transducer and coupled at its opposite end to said switch means to derive therefrom and reproduce said selected signal.

5. In a stereophonic broadcast system in which a carrier signal is modulated in accordance with the sum of the correlated left and right program signals and is separately modulated in accordance with their difference, a receiver comprising: circuit means, including a tunable radio-frequency amplifier, for selecting said carrier signal; a detector, coupled to said circuit means, for demodulating said carrier signal to derive a composite signal having components representing said sum and said difference of said program signals; program-signal-developing means, coupled to said detector, for utilizing said composite signal to develop at least one of said program signals; a de-emphasis network coupled to said detector; switch means, coupled to said program-signal-developing means and to said de-emphasis network, for selecting either one developed program signal from said program-signal-developing means or said sum of said program signals of said composite signal from said de-emphasis network; and an audio system constituting the sole audio utilizing arrangement of the receiver and consisting of a single signal-translating channel terminated at one end in an audio signal transducer and coupled at its opposite end to said switch means to derive therefrom and reproduce said selected signal.

6. In a stereophonic broadcast system in which a carrier signal is modulated in accordance with the sum of the correlated left and right program signals and is separately modulated in accordance with the difference of said program signals and also with a pilot signal, a receiver comprising: circuit means, including a tunable radio-frequency amplifier, for selecting said carrier signal; a detector, coupled to said circuit means, for demodulating said carrier signal to derive a composite signal having components representing said sum and said difference of said program signals and said pilot signal; means coupled to said detector and responsive to said pilot signal for deriving a demodulation signal related thereto; a demodulator coupled to said demodulation signal deriving means and also coupled to said detector to derive therefrom said composite signal; switch means, included in said demodulation signal deriving means, for selectively energizing said demodulator with said demodulation signal to develop at the output of said demodulator at least one of said program signals from said composite signal only when said switch means is in a first position; and an audio-system constituting the sole audio utilizing arrangement of the receiver and consisting of a single signal-translating channel terminated at one end in an audio-signal-transducer and coupled at its opposite end to said demodulator to derive therefrom only one of said program signals when said switch means is in said first position and the sum of said program signals of said composite signal when said switch means is not in said first position.

7. In a radio receiver system responsive to received stereophonic broadcast signals of the type comprising a carrier signal directly modulated by a sum signal representing the sum of the correlated left and right program signals and bearing additional modulation components corresponding to a difference signal representing the difference between such program signals, and utilizing a monophonic radio receiver for reproducing an audio signal corresponding to said sum signal the combination comprising: an auxiliary radio receiver cooperating with said sum-signal-reproducing monophonic radio receiver for effectively providing therewith a stereophonic rendition from said broadcast signals, said auxiliary receiver consisting essentially of means for receiving and selecting said stereophonic broadcast signals, detecting and matrixing means coupled to said receiving and selecting means for demodulating said broadcast signals to derive a composite signal having components corresponding to and representing said sum and difference signals respectively and for developing from said composite signal one of said program signals, and means coupled to said detecting and said matrixing means and including an audio system constituting the sole audio utilizing arrangement of the receiver and consisting of a single signal-translating channel terminated at one end in an audio-signal transducer for reproducing said developed program signal, said receiving and selecting means, said detecting and said matrixing means, and said reproducing means all being assembled in a single unit separate from said monophonic receiver and adapted to be positioned in any desired space relation therewith without the use of wire or cable connections thereto to augment the audio signal developed thereby and produce a program rendition utilizing all modulation components of said stereophonic broadcast signals.

8. An auxiliary radio receiver for use in conjunction with a monophonic radio receiver to utilize received stereophonic broadcast signals of the type comprising a carrier signal directly modulated by a sum signal representing the sum of the correlated left and right program signals and bearing additional modulation components corresponding to a difference signal representing the difference between such program signals, said auxiliary receiver comprising: means for receiving and selecting said stereophonic broadcast signals; detecting and matrixing means coupled to said receiving and selecting means for demodulating said broadcast signals to derive a composite signal having components corresponding to and representing said sum and difference signals respectively and for developing said program signals from said composite signals; means including a switch coupled to said detecting and matrixing means for selecting one or the other of said program signals; and means coupled to said switch and including an audio system constituting the sole audio utilizing arrangement of the receiver and consisting of a single signal-translating channel terminated at one end in an audio-signal transducer for reproducing said developed signal; said receiving and said selecting means, said detecting and said matrixing means, said switch and said reproducing means all being assembled in a single unit separate from said monophonic receiver and adapted to be positioned in any desired space relation therewith without the use of wire or cable connections thereto to augment the audio signal developed thereby and produce a program rendition utilizing all modulation components of said stereophonic broadcast signals.

9. A stereophonic broadcast receiving system for utilizing received stereophonic broadcast signals of the type comprising a carrier signal directly modulated by a sum signal representing the sum of the correlated left and right program signals and bearing additional modulation components corresponding to a difference signal representing the difference between such program signals, said system comprising: a monophonic radio receiver including means for receiving and selecting said stereophonic broadcast signals, detecting means coupled to said receiving and selecting means for demodulating said broadcast signals to derive said sum signal, and means coupled to said detecting means and including a loudspeaker for reproducing said sum signals; and an auxiliary radio receiver separate from said monophonic receiver and adapted to be positioned in any desired space relation therewith without the use of wire or cable connections thereto, said auxiliary receiver comprising means for receiving and selecting said stereophonic broadcast signals, detecting and matrixing means coupled to said receiving and selecting means for demodulating said broadcast signals to derive a composite signal having components corresponding to and representing said sum and difference signals respectively and for developing from said composite signal one of said program signals, and means coupled to said detecting and said matrixing means and including an audio system constituting the sole audio utilizing arrangement of the receiver and consisting of a single signal-translating channel terminated at one end in an audio-signal transducer for reproducing said developed program signal; whereby said monophonic receiver and said auxiliary receiver cooperate to develop a program rendition utilizing all modulation components of said stereophonic broadcast signals.

References Cited by the Examiner

UNITED STATES PATENTS

| | | | |
|---|---|---|---|
| 2,776,429 | 1/1957 | Olerud | 179—155 |
| 2,851,532 | 9/1958 | Crosby | 179—15 |
| 3,103,555 | 9/1963 | Sweeney | 179—155 |
| 3,122,610 | 2/1965 | Csicsatka | 179—155 |

DAVID G. REDINBAUGH, *Primary Examiner.*